US005678038A

United States Patent [19]
Dockter et al.

[11] Patent Number: 5,678,038
[45] Date of Patent: Oct. 14, 1997

[54] STORING AND RETRIEVING HETEROGENEOUS CLASSIFICATION SYSTEMS UTILIZING GLOBALLY UNIQUE IDENTIFIERS

[75] Inventors: Michael J. Dockter, Hollister; Joel F. Farber, San Jose, both of Calif.; Kevin D. Seppi, Austin, Tex.

[73] Assignee: International Business Machines Corporation, Armonk, N.Y.

[21] Appl. No.: 263,379

[22] Filed: Jun. 21, 1994

[51] Int. Cl.⁶ .................................. G06F 17/30
[52] U.S. Cl. .................. 395/600; 395/650; 395/700; 395/500
[58] Field of Search ................. 395/600, 650, 395/700, 500

[56] References Cited

U.S. PATENT DOCUMENTS

| | | | |
|---|---|---|---|
| 4,905,163 | 2/1990 | Garber et al. | 364/513 |
| 4,914,586 | 4/1990 | Swinehart et al. | 364/200 |
| 4,930,071 | 5/1990 | Tou et al. | 364/300 |
| 4,933,848 | 6/1990 | Haderle et al. | 395/600 |
| 5,133,068 | 7/1992 | Crus et al. | 395/600 |
| 5,206,951 | 4/1993 | Khoyi et al. | 395/650 |
| 5,226,161 | 7/1993 | Khoyi et al. | 395/650 |
| 5,291,583 | 3/1994 | Bapat | 395/500 |
| 5,295,256 | 3/1994 | Bapat | 395/500 |
| 5,295,261 | 3/1994 | Simonetti | 395/600 |
| 5,379,419 | 1/1995 | Heffernan et al. | 395/600 |
| 5,423,041 | 6/1995 | Burke et al. | 395/700 |
| 5,437,027 | 7/1995 | Banyon et al. | 395/600 |
| 5,448,726 | 9/1995 | Cramsie et al. | 395/600 |
| 5,448,727 | 9/1995 | Annevelink | 395/600 |

FOREIGN PATENT DOCUMENTS

| | | | |
|---|---|---|---|
| 467591 | 1/1992 | European Pat. Off. | 15/40 |
| 501770 | 2/1992 | European Pat. Off. | 15/419 |
| 483576 | 5/1992 | European Pat. Off. | 15/40 |
| 483577 | 5/1992 | European Pat. Off. | 15/40 |
| 10913 | 9/1990 | WIPO | 15/419 |

OTHER PUBLICATIONS

Korth and Silberschatz, *Database System Concepts*, McGraw-Hill Book Company, (New York,1986), pp. 380–390.

Bannerjee et al., "Data Model Issues for Object–Oriented Applications", ACM Transactions for Office Information Systems, vol. 5, No. 1, Jan., 1987, pp. 3–26.

Ketabchi et al., "Comparative Analysis of RDBMS and OODBMS: A Case Study", *COMPCON Spring '90: Thirty-Fifth IEEE Computer Society International Conference.*, San Francisco, California, 26 Feb. –2 Mar., 1990, pp. 528–537.

Tung et al., "Model Integration in an Object–Oriented Model Management System", *Proceedings of the Twenty-Fourth Annual Hawaii International Conference on System Sciences*, Kauai, HI, USA, 8–11 Jan. 1991, pp. 284–290.

Neuhold et al., "Object Identification in Interoperable Database Systems", *IMS '91 Proceedings: First International Workshop on Interoperability in Multidatabase Systems*, Kyoto, Japan, 7–9 Apr. 1991, pp. 302–305.

(List continued on next page.)

*Primary Examiner*—Thomas G. Black
*Assistant Examiner*—Paul R. Lintz
*Attorney, Agent, or Firm*—Randy W. Lacasse; David J. Kappos; Marylin S. Dawkins

[57] ABSTRACT

A system including a method for cohesively storing and retrieving heterogeneous classification systems. The database schema of the present invention is constructed of three data substructures, the Attribute Classification, Attribute Value Instance and Attribute Value schemes. The three structures track globally uniquely identified representations of the descriptions, values, and attributes of various differing classification systems and their respective contents. The use of uniquely identifiable elements throughout the database schema allows computerized management of noncompatible classification systems without programming modifications as required in the prior art systems.

21 Claims, 3 Drawing Sheets

OTHER PUBLICATIONS

Bertino et al., "Object–Oriented Database Management Systems: Concepts and Issues", *Computer*, vol. 24, No. 4, Apr., 1991, pp. 33–47.

Hitchens et al., "Bindings Between Names and Ojects in a Persistant System", *Proceedings of the Second International Workshop on Object Orientation in Operating Systems*, Dourdan, France, 24–25 Sep. 1992, pp. 26–37.

7.0 Appendix A. Related Industry Acticles/Data, 7.1 Hypertext Requirements, Gartner Group Inc., 30 Oct. 1991 pp. 47–51.

| Fahrenheit | Language | Technology |
|---|---|---|
| 76 | English | Software |
| 77 | French | Hardware |
| 78 | German | Engines |

FIG. 1 (prior art)

| | |
|---|---|
| Fahrenheit | |
| Language | |
| Technology | |
| ⋮ | |

| | |
|---|---|
| Tech | Hardware |
| Tech | Software |
| Tech | Physics |
| Lang | English |
| Lang | French |
| Lang | German |

FIG. 2

STORING AND RETRIEVING HETEROGENEOUS CLASSIFICATION SYSTEMS UTILIZING GLOBALLY UNIQUE IDENTIFIERS

BACKGROUND OF THE INVENTION

1. Field of Invention

The present invention is directed to computerized classification systems and storage/retrieval thereof. Specifically, the preset invention is directed to a system which uses database formatting of unique identifications of classifications and values to allow for storage/retrieval of heterogenous classification systems.

2. Related Materials and Definitions

This application is related to the following co-pending applications which are hereby incorporated by reference:

UNIVERSAL TAG IDENTIFIER ARCHITECTURE (application Ser. No. 07/963,885), U.S. Pat. No. 5,414,841, METHOD FOR GENERATING CONNECTIONS BETWEEN OBJECTS IN A COMPUTER NETWORK (GRINDING) (application Ser. No. 08/262,999), pending.

FACILITY FOR THE INTELLIGENT SELECTION OF INFORMATION OBJECTS (PERSONA) (application Ser. No. 08/262,834), pending FACILITY FOR THE STORAGE AND MANAGEMENT OF INFORMATION OBJECTS (NOUMENA SERVER) application Ser. No. 08/263,146), now U.S. Pat. No. 5,557,790

METHOD FOR THE ASSOCIATION OF HETEROGENEOUS INFORMATION (application Ser. No. 08/262,838), pending and FACILITY FOR THE STORAGE AND MANAGEMENT OF CONNECTIONS (CONNECTION SERVER) (application Ser. No. 08/267,022), pending.

The following definitions may be helpful to the understanding of the terminology as cited throughout the above related materials. This terminology may be used throughout the background, specification and claims of the present invention:

Tags: Tags are globally unique identifiers. Tags are sequentially numbered identifiers identifying data objects (i.e. video, text, audio, observations, opinions, etc.)

Phenomena: The logical structure of the system begins with a unit of human perception, the "phenomena". In the universe of a computer system, "Phenomena" is defined as a representation of phenomena which exist in the universe of human experience. Phenomena can be ideas, written matter, video, computer data, etc. Examples include viewing a computer file using a wordprocessor, watching a digital video clip, or listening to a digital audio segment.

Connections: That which gathers (or links) Phenomena into interrelated collections. Connections are that which lead the user from one Phenomena to another Phenomena. Connections are not simply a road-map from a Phenomena to all other Phenomena. More specifically, Connections represent an observation of related Phenomena made by human or by computer observers.

Connection Attributes: In the logical structure of the system, "Connection Attributes" allow the entire network of Phenomena and Connections to become usable to each user of the system. Connection Attributes store the rationale behind each connection. In fairly generic terms, Connection Attributes describe the Who, What, Where, When and Why of a particular observation.

Noumena: Another concept in the logical structure of the system is "Noumena". Noumena are that which lie beyond the realm of human perception. In computer-based systems, such as the instant invention, they are the computer stored data, examples are "computer files" or datasets". When these computer files, the Noumena, are observed in their "raw" form, they do not resemble pictures, sounds, nor words. These Noumena resemble a series of bits, bytes, or numbers. These computer files must be manipulated by computer programs, "Phenominated", to become as they appear to the observer. In the present system, Noumena are all of the generic format computer files needed to produce a representation of a Phenomena. This includes the computer data files as well as the computer program files.

Grinding: Grinding is a systematic, computer-based observation of Phenomena. This is typically done with a "narrow view". The programs are usually looking for well defined criteria. When Phenomena are observed by the computer programs, the programs make Connections between the observed Phenomena and other Phenomena known by the programs. In effect, acting as a human observer would when viewing a Phenomena and manually Connection it to other Phenomena.

Persona: to determine the value of information based on each user's subjective preferences.

Capture: During knowledge capture, the human or computer observer Connects two Phenomena and provides the rationale for the Connection by supplying Connection Attributes. The user can also Connect the new Phenomena to previously existing Phenomena.

Retrieve: During knowledge retrieval, an observer navigates from Phenomena to Phenomena via Connections. Knowledge is delivered by experiencing the reconstituted Phenomena. Which knowledge is delivered is controlled by the Connections and the assessment of the Connection Attributes, preferably under the auspices of a Persona.

The present invention supports the overall system of co-pending application "Method for Association of Heterogeneous Information" It supports the Tag Architecture, Connection Server, Grinding, Noumena Server and the design and infrastructure of the overall system, but is not limited thereto. The term "Phenomena" could be read "object", and the term "Connection" could be read "link" in this disclosure. The distinction between Noumena and Phenomena is made to distinguish between objects as experienced by users (Phenomena) and objects as they are actually stored (Noumena).

The "Connection Server" utilizes the Classification systems data structures to efficiently organize and store Connection Attributes. The "Noumena Server" utilizes the Classification systems data structures to efficiently organize and store Noumena Attributes. The "Persona facility" utilizes the Classification systems data structures to provide the Connections Attributes which will be evaluated by the Persona.

DISCUSSION OF PRIOR ART

The prior art has failed to provide a system for storing, retrieving, and using generic representations of heterogeneous classification systems, taxonomies. The emergence of multi-media data has exacerbated this problem.

Computer databases today store information for individual classification systems. For each new classification system to be supported, these computer systems must be extensively modified. This modification normally requires a change to the database schema for each new classification systems. No computer database system, alone, is able to store heterogeneous classification systems effectively.

A computer database system today can also retrieve classification systems information. However, the query must account for the latest complete database schema in order to retrieve the information for all classification systems. This normally requires changes to the database query for every new classification system supported. In addition, changes to the existing program which uses the old classification system maybe necessary. Because of the constant changes needed when adding or maintaining classification systems, a computer database system, alone, is unable to retrieve heterogenous classification systems effectively.

Classification systems come in many forms. Some examples:

Books are classified by the Dewey Decimal System, Library of Congress number, or International Standard Book Number (ISBN).

Products are classified by brand name, part number, or Uniform Product Code (UPC).

Colors are classified by wavelength, Red-Green-Blue (RGB), Chromanance-Luminance (Y/C), or Hue-Intensity-Saturation (HIS).

Locations are classified by Latitude-Longitude-Altitude or Country-State-Town.

Animals are classified by common name or Binomial Nomenclature.

Measurements are classified by the Metric system or the English system.

Value/Worth is classified by the Dollar, Yen, Mark, Pound, etc.

Many classification systems exist and new classification systems are constantly being invented.

Using classification systems cohesively becomes important when describing complex multi-media objects (phenomena). Many objects cannot be fully described using only one classification system. These objects require compound or complex classification systems to characterize their different dimensions. As an example, a television set can be described in terms of Measurement, Value/Worth, Colors and Product. Completely different classification systems could be used to describe the program on the screen and the sound. The viewer-observed phenomena would include both the TV set and the programming. To describe objects, it is frequently necessary to use classification system in conjunction with each other.

In the prior art, each time a new classification system is added a new and separate table system must be added (see FIG. 1). In the present invention, when a new classification system is added additional classification attributes can be simply added to existing tables (see FIG. 2). If computer systems are to be able to describe objects, they must be able to store, retrieve and use heterogeneous classification systems cohesively.

OBJECTS OF THE INVENTION

It is an object of the present invention to manage heterogeneous classification systems.

It is further an object of the invention to seamlessly allow multi-media classifications, often comprised of many differing classification systems simultaneously, to co-exist together.

SUMMARY OF THE INVENTION

A system including a method for cohesively storing and retrieving heterogeneous classification systems. The database schema of the present invention is constructed of three data substructures, the Attribute Classification, the Attribute Value Instance and optionally the Attribute Value schemes. The three structures track globally uniquely identified representations of the descriptions, values, and attributes of various differing classification systems and their respective contents. The use of uniquely identifiable elements throughout the database schema allows computerized management of noncompatible classification systems without programming modifications as required in the prior art systems.

Conflicts with any other current or future system are eliminated since each classification system is uniquely identified (via unique Tags), each attribute-value pair is also globally unique. This facilitates any desired future merging of attributes or multiple separate systems.

The database schema is determined by the number of value data-types, not the number of classification systems, the queries to retrieve information need not be concerned with a frequently changing database schema.

BRIEF DESCRIPTION OF THE DRAWINGS

FIG. 1—Illustrates the prior art table classification management system.

FIG. 2—Illustrates, conceptually, the present invention table management system.

DETAILED DESCRIPTION OF THE INVENTION

Classification Systems (taxonomies)

Each supported Classification system is uniquely identified with a globally unique persistent identifier. Each supported classification system is responsible for the domain of its classification values. These values may be discrete or continuous. Classification values for a classification system need not be of the same data type.

Examples of values:

Character strings ("oval", "circular", "square", . . . )

Sequential whole numbers (0,1,2,3, . . . )

Random real numbers (234.234, 7245.73, 13.028734, . . . )

Date/Time (1992-04-04-17:54:55.295683, 1992-05-18-09:25:12.509345, . . . )

Tags (1ABCD0123456, <1ABCD9123457) (co-pending application "UNIVERSAL TAG IDENTIFIER ARCHITECTURE")

Example: In a classification system of "Emotions",
<1ABCD0123456 represents "hate"
<1 ABCD9123457 represents "love"
<1ABCD8123458 represents "indifference"
<1ABCD7123459 represents "rage"etc.

DATABASE SCHEMA

Figure 3:
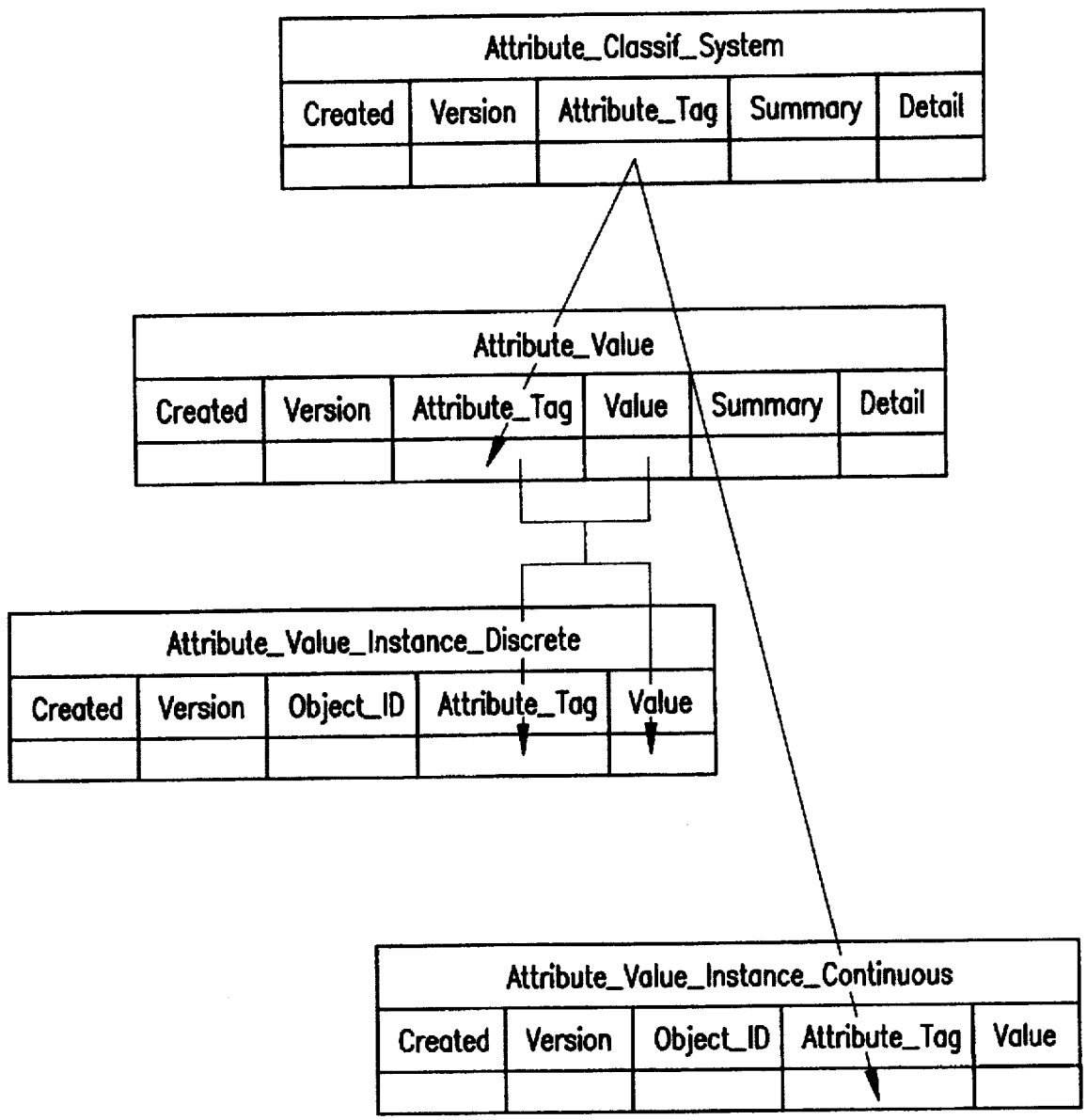
FIG. 3—Illustrates the database schema of the present invention.
Figure 4:
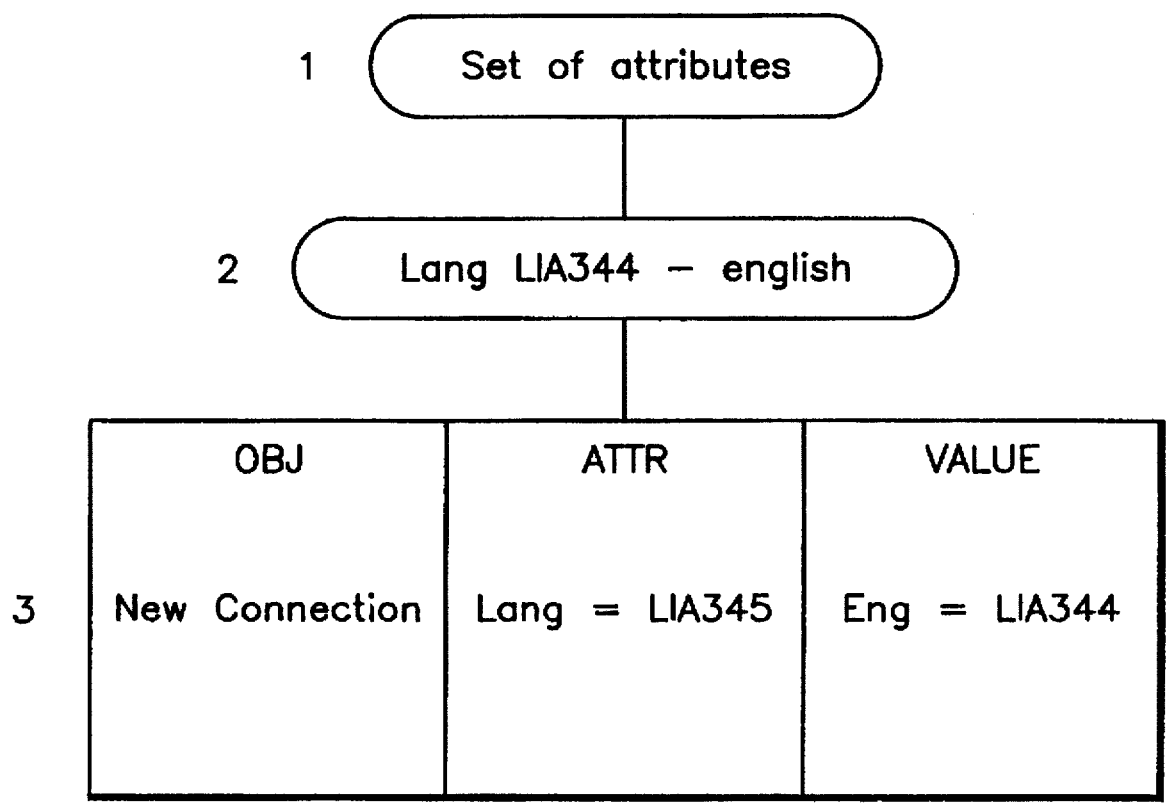
FIG. 4—Illustrates an example of an implementation of the present invention.

FIG. 3 details the database schema which consists of three types of data sub-structures:

ATTRIBUTE_CLASSIF_SYSTEM (30)
ATTRIBUTE_VALUE_INSTANCE (31)
ATTRIBUTE_VALUE (32)

The following is a description of key elements of the Classification systems database schema. This description uses SQL and Relational Database Management System terminology. However, there is no dependency on or restriction to a relational database for implementation.

The first type of table is an ATTRIBUTE_CLASSIF_SYSTEM table. The ATTRIBUTE_CLASSIF_SYSTEM, table's responsibility is to record the description of each classification system. The significant columns of the table contain:

* The Tag which identifies one of the classification systems used.
* The description of this classification system.

Example: Tag "<1ABC91" identifies the classification system of "area in terms of square feet".

In the following two tables, sets of "attribute-value pairs" are used. These "attribute-value pairs" are defined here as an ordered collection of:

1. A Tag representing the classification system used to describe an object.
2. A value representing the description within the classification system. This value may be a Tag or other data type (number, character string, etc.).

For instance, the classification system may be "temperature in Fahrenheit" known by tag "<1ABC82" and the value may be 75. the attribute-value pair would be ("<1ABC82", 75). An object is described by a collection of attribute-value pairs.

The second type of table is an ATTRIBUTE_VALUE_INSTANCE table. For each instantiation of the present invention, there may be many ATTRIBUTE_VALUE_INSTANCE tables. Each ATTRIBUTE_VALUE_INSTANCE table is attribute-value pairs for a particular data-type. One ATTRIBUTE_VALUE_INSTANCE table may hold integers attribute-values, yet another may hold Tag attribute-values. The rows in each ATTRIBUTE_VALUE_INSTANCE table hold classification values for a particular data-type from all classification systems. The significant columns of the table contain:

* The object which is being described.
* The tag which identifies the classification system used to classify the object.
* The value within the classification system which describes the object.

Borrowing from the above examples, a room known as "X" may be described in several ATTRIBUTE_VALUE_INSTANCE tables:

("X", "<1ABC91", 143.5) from the ATTRIBUTE_VALUE_INSTANCE table of real numbers.

("X", "<1ABC82", 75) from the ATTRIBUTE_VALUE_INSTANCE table of integers.

meaning that the room has an area of 143.5 square feet and a temperature of 75 degrees Fahrenheit.

The third type of table is an ATTRIBUTE_VALUE table. For each instantiation of the present invention, there may be an ATTRIBUTE_VALUE table. This table provides one level of indirection between the ATTRIBUTE_CLASSIF_SYSTEM table and certain ATTRIBUTE_VALUE_INSTANCE tables. This level of indirection provides:

* The classification of abstract, non-continuous values (e.g. "Emotions" are love, anger, fear, hate, joy).
* The compression of lengthy values into a compact symbol. The ATTRIBUTE_VALUE_INSTANCE tables which contain integer, real number, timastamp and other continuous-function data-types do not require an ATTRIBUTE_VALUE table. The significant columns of the Attribute_Value table contain:

* The tag which identifies the classification system.
* The value within the classification system.
* A Tag representing the value within this classification system.

The ATTRIBUTE_VALUE table provides resolution from a symbol, presumably a Tag, to the actual value and vice versa. Returning to the example for the room known as "X", the ATTRIBUTE_CLASSIF_SYSTEM table may contain Tag "<1ABC73" which identifies the classification system as "types of rooms". The ATTRIBUTE_VALUE table may contain:

("<1ABC73", "Bedroom", "<1ABC64")
("<1ABC73", "Bathroom", "<1ABC55")
("<1ABC73", "Kitchen", "<1ABC46")

Room "X" may now be described in several ATTRIBUTE_VALUE_INSTANCE tables:

("X", "<1ABC91", 143.5) from the ATTRIBUTE_VALUE_INSTANCE tables of real values.

("X", "<1ABC82", 75) from the ATTRIBUTE_VALUE_INSTANCE table of integers.

("X", "<1ABC73", "<1ABC46") from the ATTRIBUTE_VALUE_INSTANCE table of Tags.

meaning that the room has an area of 143.5 square feet and a temperature of 75 degrees Fahrenheit and is a Kitchen.

Since each classification system is identified by a unique Tag which is an attribute in all sub-structures (column in all tables), the database schema is not sensitive to any particular classification system. It also provides for a virtually unlimited number classification systems to be described and used together with facilities to coordinate access to multiple taxonomies or classification systems;

In use, a requestor of classification information for a certain object presents simple queries to the database. For each ATTRIBUTE_VALUE_INSTANCE table queried, the database can return information from multiple classification systems. The number of queries presented is not dependent on the number of classification systems, rather it is dependent on the number of value data-types. Multi-data-type representations can exist within a single classification system. By definition, only one data type should be used for each tagged classification system. Additionally, several tagged classification systems could be grouped into one "logical" classification system.

For a logical classification system, certain classification values my reside in an ATTRIBUTE_VALUE_INSTANCE table for integers, other values may reside in an ATTRIBUTE_VALUE_INSTANCE table for real numbers, still others may be in an ATTRIBUTE_VALUE_INSTANCE table for Tags. The values in an ATTRIBUTE_VALUE_INSTANCE table could be quite lengthy. In this case, by substituting a short unique symbol for the value, the length of the column containing the values in an ATTRIBUTE_VALUE_INSTANCE table is minimized.

Queries may be selective and filter results by looking for Attribute-value from only a single classification system or a set of classification systems. Provides for symbolic representation of attribute-value pairs.

The system provides for security on the value description. The values in an ATTRIBUTE_VALUE_INSTANCE table could be of sensitive nature requiring high security. By substituting a short unique symbol for the value, the visibility of the column containing the values in an ATTRIBUTE_VALUE_INSTANCE table is minimized. The values stored in the table could also be encrypted.

The system design allows structural independence of most processes enabling exploitation of computers that may be loosely coupled, multi-threaded, and/or support parallel processing. In addition, classifications systems data may be distributed. The classifications systems data may be deployed and utilized at a single location (node) or throughout a network (distributed) of connected locations (nodes).

DESCRIPTION OF THE PREFERRED EMBODIMENTS

The preferred embodiment will describe the database schema using SQL and a Relational Database Management System. However, there is no dependency on or restriction to a relational data base for implementation.

Attribute_Classif_System—descriptions of classification systems

Columns:
Created: Data/Time when an Attribute row was inserted.
Version: Version number of the row format.
Attribute_Tag: Tag representing Attribute class.
Summary: Short description of classification system.
Detail: The complete definition of what the classification system represents.
(Rules, qualifications, restrictions, characteristics, usage, . . . )

```
CREATE TABLE Attribute_Classif_System (
    Created         timestamp       NOT NULL,
    Version         varchar(30)     NOT NULL,
    Attribute_Tag   varchar(30)     NOT NULL,
    Summary         varchar(50)     NOT NULL,
    Detail          varchar(2000)   NOT NULL,
    PRIMARY KEY (Attribute)
);
CREATE UNIQUE INDEX Attribute_IX1 ON
Attribute_Classif_System (
    Attribute_Tag
);
```

Attribute_Value - Description of an attribute-value combination.
Columns:
Created: Date/Time when a row was inserted.
Version: Version number of the row format.
Attribute_Tag: Tag for attribute class.
Value: A specific, defined characteristic within the attribute class.
Sumary: A short description of what the attribute-value represents.
Detail: The complete definition of what the attribute-value represents.
(Rules, qualifications, restrictions, characteristics, usage, . . .)

```
CREATE TABLE Attribute_Value (
    Created         timestamp       NOT NULL,
    Version         varchar(30)     NOT NULL,
    Attribute_Tag   varchar(30)     NOT NULL,
    Value           varchar(30)     NOT NULL,
    Summary         varchar(50)     NOT NULL,
    Detail          varchar(2000)   NOT NULL,
    PRIMARY KEY (Attribute_Tag, Value),
    FOREIGN KEY (Attribute_Tag) REFERENCES
    Attribute_Classif_System ON DELETE CASCADE
);
CREATE UNIQUE INDEX Attribute_Value_IX1 ON attribute_Value(
    Attribute, Value
);
```

Attribute_Value_Instance_Discrete - Discrete attribute-value pairs
Columns:
Created: Date/Time when a row was inserted.
Version: Version number of the row format.
Object_ID: Tag for object assocoicated with attribute-value pair.
Attribute_Tag: Tag for attribute class.
Value: A, specific, defined characteristic within the attribute class.

```
CREATE TABLE Attribute_Value_Instance_Discrete(
    Created         timestamp       NOT NULL,
    Version         varchar(30)     NOT NULL,
    Object_ID       varchar(30)     NOT NULL,
    Attribute_Tag   varchar(30)     NOT NULL,
    Value           varchar(30)     NOT NULL,
    FOREIGN KEY (Attribute_Tag, Value) REFERENCES
    Attribute_Value ON DELETE CASCADE
);
CREATE INDEX Discrete_IX1 ON Attribute_Value_Instance_Discrete
(Object_ID);
```

Attribute_Value_Instance_Continuous - Continuous attribute-value pais.
Columns:
Created: Date/Time when a row was inserted.
Version: Version number of the row format.
Object_ID: Tag for object associated with attribute- - value pair.
Attribute_Tag: Tag for attribute class.
Value: A specific, defined characteristic within the attribute class which has, in this example, a time-stamp data type.

```
CREATE TABLE Attribute_Value_Instance_Continuous(
    Created         timestamp       NOT NULL,
    Version         varchar(30)     NOT NULL,
    Object_ID       varchar(30)     NOT NULL,
    Attribute_Tag   varchar(30)     NOT NULL,
    Value           timestamp       NOT NULL,
    FOREIGN KEY (Attribute_Tag) REFERENCES
    Attribute_Classif_System ON DELETE CASCADE
);
CREATE INDEX Continuous_IX1 ON Attribute_Value_Instance-
Continuous (
    Object_ID
);
```

CONCLUSION

A system and method has been shown in the above embodiments capable of managing heterogeneous classification systems through the a systematic interrelating of unique identifiers. While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. A computer-based schema for managing heterogeneous classification systems comprising:

a classification system table structure having entries corresponding to heterogeneous classification systems, the entries including a globally unique classification system identifier field and a classification system description field, and a value-instance table structure having a plurality of entries, the entries including a globally unique object identifier field, a globally unique classification system identifier field, and an attribute value field.

2. A computer-based schema as recited in claim 1, wherein said object identifier field corresponds to connections in a computer database.

3. A computer-based schema as recited in claim 1, wherein said object identifier field corresponds to data objects in a computer.

4. A computer-based schema as recited in claim 1, wherein the globally unique classification system identifier field and globally unique object identifier field accept globally unique tag values.

5. A computer-based schema as recited claim 1, wherein the classification system table structure entries and the value-instance table structure entries further include a version field identifying a version for the entry.

6. A computer-based schema as recited claim 1, wherein the classification system table structure entries and the value-instance table structure entries further include a creation-time field identifying a time of creation for the entry.

7. A computer-based schema as recited in claim 1, further comprising:
a value table structure having entries corresponding to discontinuous values within the classification system, the entries including a globally unique classification system identifier field, a globally unique value identifier field, and a value description field.

8. A computer-based schema as recited in claim 7, wherein the globally unique value identifier field accepts globally unique tag values.

9. A computer-based schema as recited in claim 8, wherein the value table structure entries further include a version field identifying a version for the entry and a creation-time field identifying a time of creation for the entry.

10. In a computer database system for storing objects linked by connections, a method for classifying connection attributes, comprising the steps of:

receiving a description of a classification system;

generating a globally unique identifier to identify the classification system;

storing the globally unique classification system identifier and the classification system description in a classification system data structure entry;

receiving an object identifier;

receiving a value instance identifying a value within the classification system, the value instance corresponding to the object represented by the object identifier, and storing the object identifier, the globally unique classification system identifier, and the value instance in a value-instance data structure entry.

11. A computer-based method as recited in claim 10, wherein the globally unique classification system identifier and object identifier are globally unique tags.

12. A computer-based method as recited in claim 10, further comprising the steps of:

receiving a version identifier which designates a version for the classification-system data structure entry;

receiving a version identifier which designates a version for the value-instance data structure entry;

storing the version identifier of the classification system in the classification-system data structure entry; and storing the version identifier of the value instance in the value-instance data structure entry.

13. A computer-based method as recited in claim 10, further comprising the steps of:

receiving a creation-time identifier which designates a time of creation for the classification-system data structure entry;

receiving a creation-time identifier which designates a time of creations for the value-instance data structure entry;

storing the creations-time identifier of the classification system in the classification-system data structure entry; and storing the creation-time identifier of the value instance in the value-instance data structure entry.

14. A computer-based method as recited in claim 10, further comprising the steps of:

receiving a description of a value within the classification system, the value being one of a set of discontinuous values;

generating a globally unique identifier to identify the value; and storing the classification system identifier, the globally value identifier, and the value description in a value data structure entry.

15. A computer-based method as recited in claim 14, further comprising the steps of:

receiving a version identifier which designates a version for the value data structure entry;

storing the version identifier of the value in the value data structure entry;

receiving a creation-time identifier which designates a time of creation for the value data structure entry; and storing the creation-time identifier in the value data structure entry.

16. A computer-based method for storing and retrieving heterogeneous classification systems, comprising the steps of:

receiving a description of a classification system;

generating a globally unique identifier to identify the classification system;

storing the classification system identifier and the classification system description in a classification system data structure entry;

receiving an object identifier;

receiving a value representation identifying either a continuous type value or discontinuous type value within the classification system, the value representation corresponding to a connection represented by the object identifier;

storing the object identifier, the classification system identifier, and the value representation in a data structure entry, and whereby objects of differing classifications can be represented by a common data structure.

17. A computer-based method for storing and retrieving heterogeneous classification systems as recited in claim 16, wherein the classification system data structure entries and the continuous value representation entries further include a version field identifying a version for the entry.

18. A computer-based method for storing and retrieving heterogeneous classification systems, as recited in claim 16, wherein the classification system data structure entries and the continuous type value representation entries further include a creation-time field identifying a time of creation for the entry.

19. A computer-based method for storing and retrieving heterogeneous classification systems, as recited in claim 16, wherein said discontinuous value representation includes a classification system identifier field, a value identifier field, and a value description field.

20. A computer-based method for storing and retrieving heterogeneous classification systems, as recited in claim 19, wherein the value identifier field accepts globally unique tag values.

21. A computer-based method for storing and retrieving heterogeneous classification systems, as recited in claim 20, wherein the discontinuous value representation entries further include a version field identifying a version for the entry and a creation-time field identifying a time of creation for the entry.

* * * * *

UNITED STATES PATENT AND TRADEMARK OFFICE
CERTIFICATE OF CORRECTION

PATENT NO. : 5,678,038

DATED : October 14, 1997

INVENTOR(S) : Dockter et al.

It is certified that error appears in the above-identified patent and that said Letters Patent is hereby corrected as shown below:

Column 1, line 10, "preset" should be - - present - -.

Column 1, line 13-14, "heterogenous" should be - - heterogeneous - -.

Column 3, line 8, "maybe" should be - - may be - -.

Column 5, line 63, "timastamp" should be - - timestamp - -.

Column 8, line 28, "Continuous" should be - - _Continuous - -.

Column 8, line 45, insert - - computer memory; - -.

Column 8, line 46, after "structure" insert - - , located within said computer memory, - -.

Column 8, line 46, after "having" insert - - first - - .

Column 8, line 47, after "to" insert - - two or more - -.

Column 8, line 48, before "entries" insert - - first - -.

Column 8, line 48, after "entries" insert - - each - -.

Column 8, line 48, after "including" delete "a" and insert therefore - - at least - -.

Column 8, line 50, after "structure" insert - - , located within said computer memory, - -.

Column 8, line 51, before "entries" insert - - second - -.

Column 8, line 51, after "the" insert - - second - -.

Column 8, line 51, after "entries" insert - - each - -.

Column 8, line 51, after "including" insert - - at least - -.

UNITED STATES PATENT AND TRADEMARK OFFICE
CERTIFICATE OF CORRECTION

PATENT NO. : 5,678,038
DATED : October 14, 1997
INVENTOR(S) : Dockter et al.

It is certified that error appears in the above-identified patent and that said Letters Patent is hereby corrected as shown below:

Column 8, line 53, after "field" insert - - , and wherein said table structures provide for management of two or more heterogeneous classification systems for each globally unique object - -.

Column 9, line 23, after "attributes" insert - - of said connections - -.

Column 9, line 25, after "to" insert - - uniquely - -.

Column 9, line 27, after "storing" insert - - , in computer memory, - -.

Column 9, line 30, delete "an" and insert therefore - - a globally unique - -.

Column 9, line 34, after "the" insert - - globally unique - -.

Column 9, line 36, after "entry" insert - - located within said computer memory - -.

Column 10, line 27, after "entry" insert - - within computer memory - -.

Column 10, line 28, delete "an" and insert therefore - - a globally unique - -.

Column 10, line 36, after "entry" insert - - located within said computer memory - -.

Signed and Sealed this

Twenty-third Day of February, 1999

Attest:

Q. TODD DICKINSON

*Attesting Officer*  *Acting Commissioner of Patents and Trademarks*